(12) United States Patent
Xue et al.

(10) Patent No.: US 12,197,091 B2
(45) Date of Patent: Jan. 14, 2025

(54) LIQUID CRYSTAL SPATIAL LIGHT MODULATOR AND THREE-DIMENSIONAL DISPLAY DEVICE

(71) Applicant: BOE TECHNOLOGY GROUP CO., LTD., Beijing (CN)

(72) Inventors: Gaolei Xue, Beijing (CN); Wei Wang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 700 days.

(21) Appl. No.: 17/285,681

(22) PCT Filed: Sep. 7, 2020

(86) PCT No.: PCT/CN2020/113742
§ 371 (c)(1),
(2) Date: Apr. 15, 2021

(87) PCT Pub. No.: WO2021/082738
PCT Pub. Date: May 6, 2021

(65) Prior Publication Data
US 2021/0405472 A1 Dec. 30, 2021

(30) Foreign Application Priority Data
Oct. 28, 2019 (CN) .......................... 201911030985.1

(51) Int. Cl.
*G02F 1/1362* (2006.01)
*G03H 1/00* (2006.01)
*G03H 1/22* (2006.01)

(52) U.S. Cl.
CPC ..... *G02F 1/136209* (2013.01); *G03H 1/0005* (2013.01); *G03H 1/2294* (2013.01); *G03H 2001/0088* (2013.01)

(58) Field of Classification Search
CPC ............ G02F 1/136209; G03H 1/0005; G03H 1/2294; G03H 2001/0088
See application file for complete search history.

(56) References Cited

U.S. PATENT DOCUMENTS

| | | |
|---|---|---|
| 6,621,605 B1 | 9/2003 | Grossetie et al. |
| 2007/0109617 A1 | 5/2007 | Cable et al. |

(Continued)

FOREIGN PATENT DOCUMENTS

| | | |
|---|---|---|
| CN | 103777398 A | 5/2014 |
| CN | 105700320 A | 6/2016 |

(Continued)

OTHER PUBLICATIONS

First Office Action dated Feb. 3, 2021 received in Chinese Patent Application No. CN 201911030985.1 together with an English language translation.

*Primary Examiner* — Girumsew Wendmagegn
(74) *Attorney, Agent, or Firm* — Scully, Scott, Murphy & Presser, P.C.

(57) ABSTRACT

A liquid crystal spatial light modulator and a three-dimensional display device are provided. The liquid crystal spatial light modulator includes a base substrate and a plurality of pixel units arranged in an array. Each pixel unit includes one pixel electrode, and the pixel electrode is located on the base substrate. Each pixel unit includes a light shielding structure, and the light shielding structure is configured to divide the each pixel unit into a plurality of pixel regions.

19 Claims, 4 Drawing Sheets

(56) References Cited

U.S. PATENT DOCUMENTS

| | | | | |
|---|---|---|---|---|
| 2008/0094690 A1* | 4/2008 | Luo | ..................... | G02B 26/001 |
| | | | | 359/318 |
| 2016/0349702 A1 | 12/2016 | Sung et al. | | |
| 2018/0004054 A1* | 1/2018 | Li | ..................... | G02F 1/136227 |
| 2018/0209030 A1* | 7/2018 | Khayrullin | ............ | C23C 14/042 |
| 2018/0299661 A1* | 10/2018 | Zhu | ..................... | G02B 26/005 |

FOREIGN PATENT DOCUMENTS

| | | |
|---|---|---|
| CN | 106200340 A | 12/2016 |
| CN | 110596949 A | 12/2019 |
| JP | 2014-191177 A | 10/2014 |
| KR | 10-2018-0050453 A | 5/2018 |
| WO | 2019/048867 A1 | 3/2019 |

\* cited by examiner

LIQUID CRYSTAL SPATIAL MODULATOR AND THREE-DIMENSIONAL DISPLAY DEVICE

CROSS-REFERENCE TO RELATED APPLICATIONS

The present application is a national phase entry of PCT International Application No. PCT/CN2020/113742 filed on Sep. 7, 2020 and claims priority of the Chinese Patent Application No. 201911030985.1 filed on Oct. 28, 2019. The entire disclosures of PCT International Application No. PCT/CN2020/113742 and Chinese Patent Application No. 201911030985.1 are incorporated herein by reference in its entirety as part of the present application.

TECHNICAL FIELD

At least one embodiment of the present disclosure relates to a liquid crystal spatial light modulator and a three-dimensional display device.

BACKGROUND

Holographic display technology has become an ideal three-dimensional display technology due to that it can provide depth perception at all viewpoints and distances. Dynamic three-dimensional holographic display technology reconstructs the amplitude and phase of light waves of objects at the same time, which can perfectly present the abundant information, such as positions, angles, colors and detail features, etc., of all objects in three-dimensional scene in theory, provides a continuous viewing angle and a sense of spatial depth, and accords with the viewing habits of human eyes. The spatial light modulator is the key device of loading hologram to realize dynamic holographic display.

SUMMARY

At least one embodiment of the present disclosure provides a liquid crystal spatial light modulator and a three-dimensional display device.

At least one embodiment of the present disclosure provides a liquid crystal spatial light modulator, including: a base substrate and a plurality of pixel units arranged in an array. Each of the plurality of pixel units includes one pixel electrode, the pixel electrode is located on the base substrate. Each of the plurality of pixel units includes a light shielding structure, and the light shielding structure is configured to divide the each of the plurality of pixel units into a plurality of pixel regions.

In some examples, a maximum size of each of the plurality of pixel regions in a direction parallel to the base substrate is not more than 3 microns.

In some examples, in a direction along a line connecting centers of adjacent ones of the pixel regions, a maximum size of the light shielding structure located between the adjacent ones of the pixel regions is not more than 1 micron.

In some examples, in the direction along the line connecting centers of adjacent ones of the pixel regions, the maximum size of the light shielding structure located between the adjacent ones of the pixel regions is smaller than a maximum size of the pixel region.

In some examples, a thickness of the light shielding structure is in a range from 50 nanometers to 5 microns in a direction perpendicular to the base substrate.

In some examples, an orthographic projection of the light shielding structure on the base substrate is overlapped with an orthographic projection of the pixel electrode on the base substrate, so as to divide the each of the plurality of pixel units into the plurality of pixel regions.

In some examples, the liquid crystal spatial light modulator further includes: a black matrix, an orthographic projection of the black matrix on the base substrate is located between orthographic projections of adjacent ones of the pixel units on the base substrate, the black matrix and the light shielding structure are arranged in a same layer and made of a same material.

In some examples, the black matrix and the light shielding structure are integrated.

In some examples, the liquid crystal spatial light modulator includes: an opposing substrate arranged opposite to the base substrate and a liquid crystal layer located between the opposing substrate and the base substrate. The pixel electrode in each of the plurality of pixel units is configured to drive liquid crystal molecules corresponding to the plurality of pixel regions in the each of the plurality of pixel units.

In some examples, the light shielding structure and the black matrix are both located at a light exiting side of the liquid crystal layer.

In some examples, the light shielding structure is located at one side of the liquid crystal layer away from the base substrate.

In some examples, each of the plurality of pixel units is configured to be driven independently.

In some examples, the plurality of the pixel units are uniformly distributed on the base substrate.

In some examples, a maximum size of each of the plurality of pixel units in a direction parallel to the base substrate is less than 30 microns.

In some examples, a shape of the pixel region includes a polygon or a circle.

In some examples, each of the plurality of pixel units includes the same number of pixel regions, and the plurality of pixel regions included in each of the plurality of pixel units are uniformly distributed.

At least one embodiment of the present disclosure provides a three-dimensional display device, including a processor, a light source and the liquid crystal spatial light modulator as mentioned above. The processor is connected with the liquid crystal spatial light modulator to load a signal of a preset three-dimensional hologram into the liquid crystal spatial light modulator, light emitted from the light source is incident on the liquid crystal spatial light modulator, and the liquid crystal spatial light modulator is configured to perform phase modulation on incident light according to the signal to reproduce a three-dimension image corresponding to the signal of the preset three-dimensional hologram.

In some examples, the three-dimensional image is a real image.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects.

Figure 1:
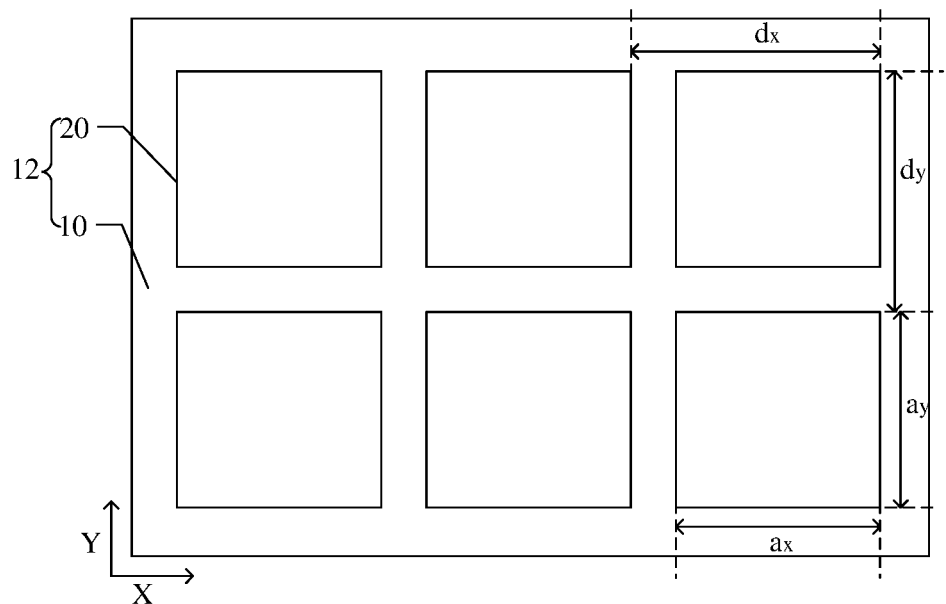
FIG. 1 is a partial planar view of a liquid crystal spatial light modulator.

FIG. 1 is a partial planar view of a liquid crystal spatial light modulator (LCSLM). As shown in FIG. 1, the liquid crystal spatial light modulator 12 includes a base substrate 10 and a plurality of pixel units 20 located on the base substrate 10. The liquid crystal spatial light modulator 12 is formed of a plurality of independent pixel units 20, the plurality of pixel units 20 are arranged in a one-dimensional or two-dimensional array in space, and each pixel unit 20 can be independently controlled by an optical signal or an electrical signal to change the deflection angle of the liquid crystal molecules corresponding to the pixel unit, thereby modulating the phase and polarization characteristic, et., of light waves illuminating the liquid crystal molecules.

According to the theory of optical diffraction, the size of the pixel unit of the spatial light modulator (each pixel unit is also referred to as a spatial light modulation unit, and each spatial light modulation unit serves as an opening region) and the distance between adjacent pixel units determine the viewing angle of the spatial light modulator when it is used for holographic three-dimensional display. As shown in FIG. 1, taking that the shape of the pixel unit 20 is a rectangle as an example, the size of each pixel unit 20 along the X direction is $a_x$, and the size of each pixel unit 20 along the Y direction is $a_y$. Along the X direction, the sum of the size of each pixel unit 20 and the distance between two adjacent pixel units 20 is $d_x$; and along the Y direction, the sum of the size of each pixel unit 20 and the distance between two adjacent pixel units 20 is $d_y$. The diffraction angle of the light emitted from the pixel unit 20 is directly determined by the sum $d_x$ of the size of the pixel unit 20 and the distance between adjacent pixel units 20 along the X direction, together with the sum $d_y$ of the size of the pixel unit 20 and the distance between adjacent pixel units 20 along the Y direction. For example, the maximum diffraction angle of the pixel unit 20 in the X direction satisfies $\beta_{max}=\sin^{-1}(\lambda/d_x)$, where $\lambda$ is the wavelength of the incident light. For example, along the X direction, in the case where the size $a_x$ of the pixel unit 20 is equal to the distance between adjacent pixel units, the maximum diffraction angle of the pixel unit 20 in the X direction satisfies $\beta_{max}=\sin^{-1}(\lambda/2a_x)$).

As shown in FIG. 1, in order to ensure the transmittance or reflectivity of light, $a_x$ is generally required to be as close as possible to $d_x$, and $a_y$ is generally required to be as close as possible to $d_y$. However, due to the limitation of circuit technology and processing conditions, it is difficult to reduce the values of $d_x$ and $d_y$.

Figure 2:
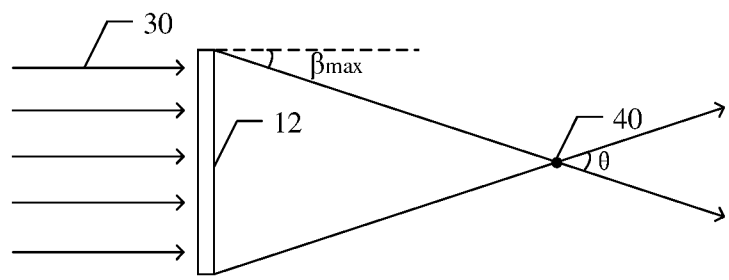
FIG. 2 is a schematic diagram of the spatial light modulator shown in FIG. 1 imaging a single point.

FIG. 2 is a schematic diagram of the spatial light modulator shown in FIG. 1 imaging a single point. As shown in FIG. 2, after a collimated light beam 30 is incident on the liquid crystal spatial light modulator 12, each pixel unit in the liquid crystal spatial light modulator 12 modulates the incident light to reproduce an image point 40, the maximum viewing angle θ of the reproduced image point 40 is determined by the maximum diffraction angle $\beta_{max}$ of the pixel unit of the liquid crystal spatial light modulator 12, while the maximum diffraction angle $\beta_{max}$ of the pixel unit is determined by the size of the pixel unit and the distance between adjacent pixel units, for example, $d_x$ and $d_y$.

Figure 3:
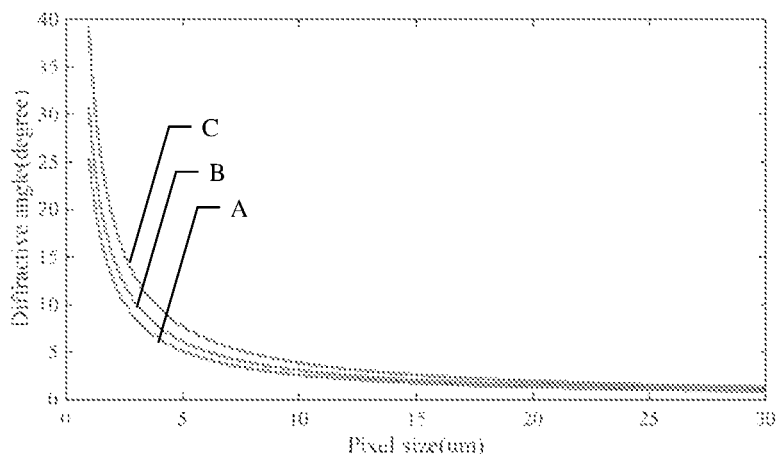
FIG. 3 is a diagram showing the relationship between the size of a pixel unit in one direction and the maximum viewing angle of an image point reproduced by the pixel unit.

FIG. 3 is a diagram showing the relationship between the size of a pixel unit in one direction and the maximum viewing angle of an image point reproduced by the pixel unit. As shown in FIG. 3, in the case where the light incident on the pixel unit is incident light A with a wavelength of 445 nm, the maximum viewing angle of the reproduced image point gradually increases as the size of the pixel unit decreases. In the case where the size of the pixel unit is less than 1 micron, the maximum viewing angle of the reproduced image point is not less than 25 degrees. In the case where the light incident on the pixel unit is incident light B with a wavelength of 532 nm, the maximum viewing angle of the reproduced image point gradually increases as the size of the pixel unit decreases. In the case where the size of the pixel unit is less than 1 micron, the maximum viewing angle of the reproduced image point is not less than 30 degrees. In the case where the light incident on the pixel unit is incident light C with a wavelength of 671 nm, the maximum viewing angle of the reproduced image point gradually increases as the size of the pixel unit decreases. In the case where the size of the pixel unit is less than 1 micron, the maximum viewing angle of the reproduced image point is not less than 35 degrees. As the wavelength of the incident light increases, the maximum viewing angle of the image point reproduced by the pixel unit will also increase. As can be viewed from FIG. 3, in the case where the size of the pixel unit is less than 1 micron, the viewing angle of the reproduced image point can basically meet the viewing requirements of human eyes for three-dimensional objects.

In research, the inventors of the present application have observed that the size of the pixel unit in the spatial light modulator, such as $a_x$ and $a_y$, is generally several microns to several tens of microns, and the viewing angle of the reproduced holographic image is not more than 10 degrees, which is difficult to meet the viewing requirements of human eyes. The spatial light modulator can be divided into intensity modulation type and phase modulation type according to different functions. At present, the minimum size of the pixel unit in a commercial liquid crystal spatial light modulator of a pure phase modulation type is 3.74 microns, and the viewing angle of a holographic three-dimensional image produced by it is small, and for example, the viewing angle is only a few degrees. Because the limitation of processes and liquid crystal materials, it is still a difficult problem to reduce the size of a single pixel unit in the spatial light modulator.

In order to increase the viewing angle of the holographic display image, two methods, spatial multiplexing and time-sharing multiplexing, are commonly used. The spatial multiplexing method requires multiple spatial light modulators to be spliced in an arc shape to increase the diffraction angle, but this method increases the complexity and cost of the system. The time-sharing multiplexing method needs to load holograms with different viewing angles in a time-sharing way by using spatial light modulators with high refresh frequency, and then project images with different viewing angles through time-sharing incidence of multiple light beams at different angles, so as to realize the visual effect of three-dimensional images with a large viewing angle according to the persistence effect of human eyes; but this method is faced with the problems of complex system and seamless splicing.

The embodiments of the present disclosure provide a liquid crystal spatial light modulator and a three-dimensional display device. The liquid crystal spatial light modulator includes a base substrate and a plurality of pixel units arranged in an array. Each pixel unit includes one pixel electrode, and the pixel electrode is located on the base substrate. Each pixel unit includes a light shielding structure, and the light shielding structure is configured to divide the each pixel unit into a plurality of pixel regions. The light shielding structure in the embodiments of the present disclosure plays a light shielding role, and the light shielding structure can divide each pixel unit into a plurality of pixel regions, and each pixel region can serve as an opening region to modulate the incident light, so as to achieve the purpose of improving the diffraction angle of the output light, thereby increasing the viewing angle of the image point reproduced by the liquid crystal spatial light modulator to basically meet the viewing requirements of human eyes for three-dimensional objects. Moreover, the liquid crystal spatial light modulator provided by the embodiments of the disclosure has a simple structure and can effectively reduce the cost.

The liquid crystal spatial light modulator and the three-dimensional display device provided by the embodiments of the present disclosure will be described below with reference to the accompanying drawings.

Figure 4:
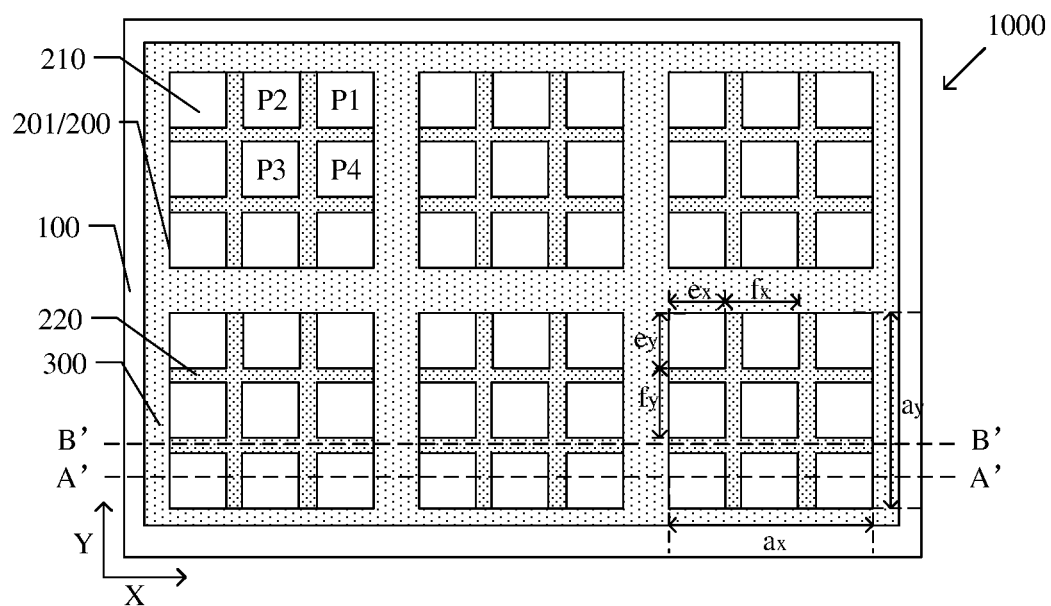
FIG. 4 is a partial planar view of a liquid crystal spatial light modulator according to an embodiment of the present disclosure.

FIG. 4 is a partial planar view of a liquid crystal spatial light modulator according to an embodiment of the present disclosure. As shown in FIG. 4, the liquid crystal spatial light modulator 1000 includes a base substrate 100 and a plurality of pixel units 200. The plurality of pixel units 200 are arranged in an array. For example, the plurality of pixel units 200 can be arranged in an array along the X direction and the Y direction. The embodiments of the present disclosure are not limited thereto, and the plurality of pixel units 200 can also be arranged in a one-dimensional array. As shown in FIG. 4, each pixel unit 200 includes one pixel electrode 201, and the pixel electrode 201 is located on the base substrate 100. Each pixel unit 200 includes a light shielding structure 220, and the light shielding structure 220 is configured to divide each pixel unit 200 into a plurality of pixel regions 210. The light shielding structure in the liquid crystal spatial light modulator plays a light shielding role, and the light shielding structure can divide each pixel unit into a plurality of pixel regions, and each pixel region can serve as an opening region to modulate the incident light, so as to achieve the purpose of improving the diffraction angle of the output light, thereby increasing the viewing angle of the image point reproduced by the liquid crystal spatial light modulator to basically meet the viewing requirements of human eyes for three-dimensional objects.

For example, the pixel unit of the liquid crystal spatial light modulator can also be referred to as a spatial light modulation unit, and each spatial light modulation unit can be independently controlled to modulate the light incident on the corresponding spatial light modulation unit. The pixel region can also be referred to as a spatial light modulation region, and each spatial light modulation region serves as an opening region to modulate the light incident on the spatial light modulation region.

For example, as shown in FIG. 4, an orthographic projection of the light shielding structure 220 on the base substrate 100 is overlapped with an orthographic projection of the pixel electrode 201 on the base substrate 100. For example, as shown in FIG. 4, in each pixel unit 200, the light shielding structure 220 is located between adjacent pixel regions 210 to separate the pixel regions 210 from each other. The "adjacent pixel regions" appearing here and in the following means that in the case where the connecting line between the centers of two pixel regions does not pass through any other pixel region, these two pixel regions are adjacent pixel regions. For example, as shown in FIG. 4, taking the pixel region P1 as an example, the pixel region P2, the pixel region P3 and the pixel region P4 are all pixel regions adjacent to the pixel region P1.

Figure 5A:
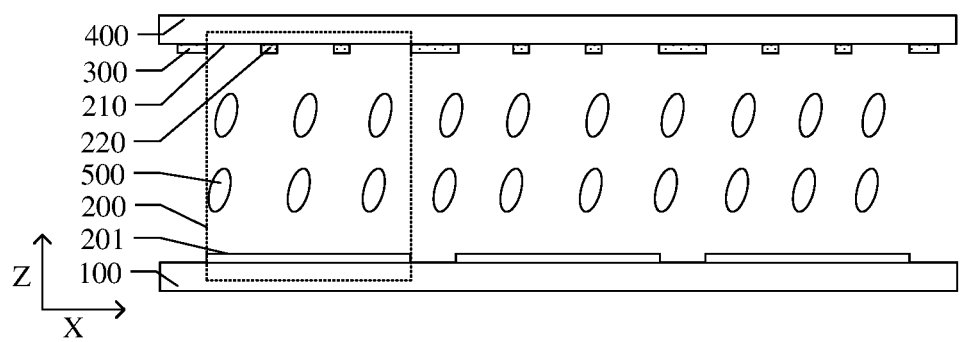
FIG. 5A is a cross-sectional view taken along line A'A' in FIG. 4.

In some examples, FIG. 5A shows a partial structure in a cross-sectional view taken along line A'A' in FIG. 4. As shown in FIG. 5A, the liquid crystal spatial light modulator includes an opposing substrate 400 arranged opposite to the base substrate 100, and a liquid crystal layer 500 located between the opposing substrate 400 and the base substrate 100. The pixel electrode 201 in each pixel unit 200 is configured to drive liquid crystal molecules corresponding to the plurality of pixel regions 210 in the each pixel unit 200. For example, each pixel unit 200 is configured to be driven independently. That is, each pixel unit 200 is an independent pixel unit, and by applying a voltage to one pixel electrode 201 included in each pixel unit 200, each pixel unit 200 can independently receive the control of electrical signals so as to modulate the amplitude, intensity, phase or polarization, etc., of light waves illuminating the liquid crystal molecules in the pixel unit.

The liquid crystal spatial light modulator provided by the embodiments of the present disclosure can be used to reproduce a computational mechanism holographic volume view and construct a three-dimensional display system. The liquid crystal spatial light modulator is an active wave surface transformation device based on the electric birefringence effect of liquid crystal molecules, and has the function of phase modulation.

For example, a light field camera can be used to acquire the intensity information and depth information of a three-dimensional object or a three-dimensional scene, and then the intensity information and depth information is input to a computer, thus obtaining a hologram.

For example, the computer can be connected with the liquid crystal spatial light modulator through a video interface, so as to load a calculated three-dimensional object hologram into the spatial light modulator. For example, the liquid crystal spatial light modulator includes an electrically addressed pure-phase liquid crystal spatial light modulator, which controls the birefringence of liquid crystal by controlling the voltage to change the spatial orientation of liquid crystal molecules in the liquid crystal layer, so as to control the phase plane of light waves. The nematic liquid crystal in the pure-phase liquid crystal spatial light modulator is a kind of uniaxial birefringent crystal, and the optical axis thereof is parallel to the major axis of liquid crystal molecules. When an external electric field is applied to the liquid crystal molecules, the liquid crystal molecules tilt, resulting in a phase difference between the incident light incident on the liquid crystal layer and the output light obtained after the incident light passes through the liquid crystal layer. Therefore, when different voltages are applied to the pixel electrodes in respective pixel units, the liquid crystal molecules that are driven by the pixel electrodes to deflect will perform corresponding phase modulation on the incident light.

For example, the laser beam emitted from a semiconductor laser is collimated and expanded, and then irradiated on the spatial light modulator; after the beam is modulated by the hologram, the diffracted light exited from the spatial light modulator is imaged by a lens for human observation. For example, the size of the reproduced image is related to the wavelength of the reproducing light, the size of the pixel unit and the pitch of the pixel units in the spatial light modulator, the reproduction distance and the focal length of the imaging lens.

In some examples, as shown in FIG. 4 and FIG. 5A, the maximum size of each pixel unit 200 in the direction parallel to the base substrate 100 is less than 30 microns. For example, the maximum size of each pixel unit 200 in the direction parallel to the base substrate 100 is less than 10 microns. For example, the maximum size of each pixel unit 200 in the direction parallel to the base substrate 100 is less than 4 microns.

For example, the shape and size of the pixel unit in the present example can be the same as those of the pixel unit in the liquid crystal spatial light modulator shown in FIG. 1. For example, in the case where the shape of the pixel units in the present example and the shape of the liquid crystal spatial light modulator shown in FIG. 1 are rectangular, and each pixel unit has a size of $a_x$ in the X direction and a size of $a_y$ in the Y direction, in the liquid crystal spatial light modulator shown in FIG. 1, each pixel unit as a whole serves as an opening region to modulate incident light to generate diffracted light, and the overall size of each pixel unit determines the diffraction angle of the diffracted light; while in the embodiment of the present disclosure, each pixel unit is divided into a plurality of pixel regions by the light shielding structure, and each pixel region serves as an opening region to modulate incident light to generate diffracted light, and the size of each pixel region determines the diffraction angle of the diffracted light. Because the size of the pixel region in the embodiment of the present disclosure is smaller than the size of the pixel unit shown in FIG. 1, it is equivalent to reducing the size of the pixel point and increasing the diffraction angle of the output light, thereby increasing the viewing angle of the image point reproduced by the liquid crystal spatial light modulator.

Figure 5B:
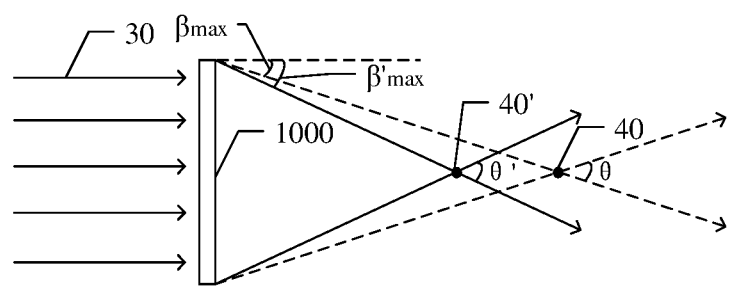
FIG. 5B is a schematic diagram of the spatial light modulator shown in FIG. 4 imaging a single point.

FIG. 5B is a schematic diagram of the spatial light modulator shown in FIG. 4 imaging a single point. As shown in FIG. 5B, after the collimated light beam 30 is incident on the liquid crystal spatial light modulator 1000, each pixel unit in the liquid crystal spatial light modulator 1000 modulates the incident light to reproduce an image point 40', and the maximum viewing angle $\theta'$ of the reproduced image point 40' is determined by the maximum diffraction angle $\beta'_{max}$ of the pixel unit of the liquid crystal spatial light modulator 1000. The dashed arrow in FIG. 5B indicates diffracted light (i.e., the diffracted light in FIG. 2) generated in the case where each pixel unit is not provided with a light shielding structure and each pixel unit as a whole serves as an opening to modulate the incident light. The diffracted light reproduces an image point 40, and the maximum diffraction angle of the diffracted light is $\beta_{max}$, so that the viewing angle of the image point 40 is $\theta$. The solid arrow in FIG. 5B indicates diffracted light generated in the case where each pixel unit is divided into a plurality of pixel regions by the light shielding structure and each pixel region serves as an opening region to modulate the incident light. The diffracted light reproduces the image point 40', and maximum diffraction angle of the diffracted light is $\beta'_{max}$. Because the diffraction angle $\beta'_{max}$, is greater than the diffraction angle $\beta_{max}$, the viewing angle $\theta'$ of the image point 40' is greater than the viewing angle $\theta$, and therefore, the liquid crystal spatial light modulator provided by the embodiments of the present disclosure can increase the viewing angle of the reproduced image point.

For example, as shown in FIG. 4, the size of each pixel unit 200 in the X direction is $a_x$, and the size of each pixel unit 200 in the Y direction is $a_y$. The shape of each pixel region 210 can be a rectangle, the size of the pixel region 210 in the X direction is $e_x$, and the size of the pixel region 210 in the Y direction is $e_y$, thus, each pixel region 210 is an opening region with the size of $e_x*e_y$ divided by the light shielding structure 220. In the X direction, the sum of the size of each pixel region 210 and the distance between adjacent pixel regions 210 is $f_x$, and in the Y direction, the sum of the size of each pixel region 210 and the distance between adjacent pixel regions 210 is $f_y$.

In some examples, as shown in FIG. 4 and FIG. 5A, the maximum size of each pixel region 210 in the direction parallel to the base substrate 100 is not more than 3 microns. For example, the maximum size of each pixel region 210 in the direction parallel to the base substrate 100 is not more than 2 microns.

For example, the maximum size of each pixel region 210 in the direction parallel to the base substrate 100 is not more than 1.5 microns. Therefore, referring to the relationship between the size of the pixel unit in one direction and the maximum viewing angle of the reproduced image point shown in FIG. 3, and taking that the wavelength of the incident light is 532 nm as an example, in the case where the side length of the pixel region 210 having a shape of rectangular is less than 1 micron, the maximum viewing angle of the image point reproduced by the liquid crystal spatial light modulator can reach more than 30 degrees. That is, the size $e_x$ of the pixel region 210 in the X direction and the size $e_y$ of the pixel region 210 in the Y direction may both be not more than 1 micron, so that the viewing angle of the image point reproduced by the liquid crystal spatial light modulator can reach more than 30 degrees both in the X direction and in the Y direction, so as to meet the viewing requirements of human eyes for three-dimensional objects.

In some examples, in the direction along the line connecting centers of adjacent pixel regions 210, the maximum size of the light shielding structure 220 located between the adjacent pixel regions 210 is not more than 1 micron.

For example, as shown in FIG. 4, the extension direction of line connecting centers of the pixel region P1 and the pixel region P2 is the X direction, and the maximum size of a part of the light shielding structure 220 located between the pixel region P1 and the pixel region P2 in the X direction is not more than 1 micron.

For example, as shown in FIG. 4, assuming that the extension direction of the line connecting centers of the pixel region P1 and the pixel region P3 is S direction, the maximum size of a part of the light shielding structure 220 located between the pixel region P1 and the pixel region P3 in the S direction is not more than 1 micron.

For example, as shown in FIG. 4, the light shielding structure 220 includes a plurality of strip-shaped light shielding sub-structures, and the plurality of strip-shaped light shielding sub-structures are intersected with each other to divide the pixel unit 200 into a plurality of pixel regions 210 arranged in an array. The line width of each strip-shaped light shielding sub-structure is not more than 1 micron.

In some examples, in the direction along the line connecting centers of adjacent pixel regions 210, the maximum size of the light shielding structure 220 located between the adjacent pixel regions 210 is smaller than the maximum size of the pixel region 210. In the embodiments of the present disclosure, the light transmittance of each pixel unit can be ensured by setting the width of the light shielding structure between adjacent pixel regions to be relatively small.

For example, in the direction along the line connecting centers of adjacent pixel regions 210, the maximum size of the light shielding structure 220 located between the adjacent pixel regions 210 is in the range from 0.1 microns to 0.5 microns.

For example, in the direction along the line connecting centers of adjacent pixel regions 210, the maximum size of the light shielding structure 220 located between the adjacent pixel regions 210 is in the range from 0.3 microns to 0.8 microns.

For example, the size $a_x$ of the pixel unit 200 in the X direction is 7 microns, the size $a_y$ of the pixel unit 200 in the Y direction is 7 microns, the size $e_x$ of the pixel region 210 in the X direction is 1 micron, the size $e_y$ of the pixel region 210 in the Y direction is 1 micron, then, the sum $f_x$ of the sizes of the pixel region 210 and the light shielding structure 220 adjacent thereto in the X direction is 2 microns, and the sum $f_y$ of the sizes of the pixel region 210 and the light shielding structure 220 adjacent thereto in the Y direction is 2 microns. If the pixel unit 200 is not provided with the light shielding structure 220 and the whole pixel unit 200 serves as an opening region, according to the formula of maximum diffraction angle $\beta_{max}$, the maximum diffraction angle generated when the incident light with a wavelength of 532 nm passes through the pixel unit 200 is about 2.18 degrees, and the maximum viewing angle of holographic imaging by the liquid crystal spatial light modulator without the light shielding structure is about 4.36 degrees. In the case where the pixel unit 200 is divided into nine pixel regions 210, each pixel region 210 is an opening region, and the maximum diffraction angle generated when the incident light with a wavelength of 532 nm is incident on the pixel region 210 is about 15.43 degrees, and then the viewing angle of holographic imaging by the liquid crystal spatial light modulator with the light shielding structure is about 30.86 degrees. Therefore, compared with the liquid crystal spatial light modulator without the light shielding structure in the pixel unit, the embodiments of the present disclosure, the viewing angle of the liquid crystal spatial light modulator when used for holographic imaging can effectively increase by arranging the light shielding structure in the pixel unit to divide each pixel unit into a plurality of pixel regions.

For example, when designing the size of the pixel region, it can be considered that in any direction of the X direction and the Y direction, the size of the pixel unit is an integral multiple of the size of the pixel region and an integral multiple of the size of the distance between adjacent pixel regions; or in any direction of the X direction and the Y direction, the size of the pixel unit is an integral multiple of the sum of the size of the pixel region and the size of the distance between adjacent pixel regions, thus facilitating design.

In some examples, as shown in FIG. 5A, in the direction perpendicular to the base substrate 100, that is, the Z direction, the thickness of the light shielding structure 220 is in the range from 50 nanometers to 5 micrometers.

For example, the light shielding structure 220 can adopt a metal material or any other light absorbing material to achieve a light shielding effect.

In some examples, as shown in FIG. 5A, the liquid crystal spatial light modulator further includes a black matrix 300. An orthographic projection of the black matrix 300 on the base substrate 100 is located between the orthographic projections of adjacent pixel units 200 on the base substrate 100. That is, the black matrix 300 is configured to divide the liquid crystal spatial light modulator into a plurality of pixel units 200 separated from each other. The black matrix 300 can be arranged in the same layer and made of the same material as the light shielding structure 220. Here, "same layer" refers to the relationship between multiple film layers which are formed by the same material after the same step (such as one-step patterning process). Here, "same layer" does not always mean that the thicknesses of multiple films are the same or the heights of multiple films in a cross-sectional view are the same. For example, the black matrix 300 and the light shielding structure 220 are formed by the same patterning process to save process steps. Of course, the embodiments of the present disclosure are not limited to the case that the black matrix and the light shielding structure are arranged in the same layer and/or made of the same material, but they can also be located in different layers and/or made of different materials.

In some examples, as shown in FIG. 5A, both the light shielding structure 220 and the black matrix 300 are located at the light exiting side of the liquid crystal layer 500. Taking the structure shown in FIG. 5A as an example, both the base substrate 100 and the pixel electrode 201 are light-transmitting structures, and the incident light is incident on the liquid crystal layer 500 from one side of the base substrate 100 away from the liquid crystal layer 500; after the pixel electrode 201 is applied with an voltage, the liquid crystal molecules in the pixel unit 200 deflect to modulate the phase of the incident light, and the light whose phase is modulated by the liquid crystal molecules is diffracted when exiting from the opening region (the pixel region 210) formed of the black matrix 300 and the light shielding structure 220, so as to reproduce the image.

Figure 6:
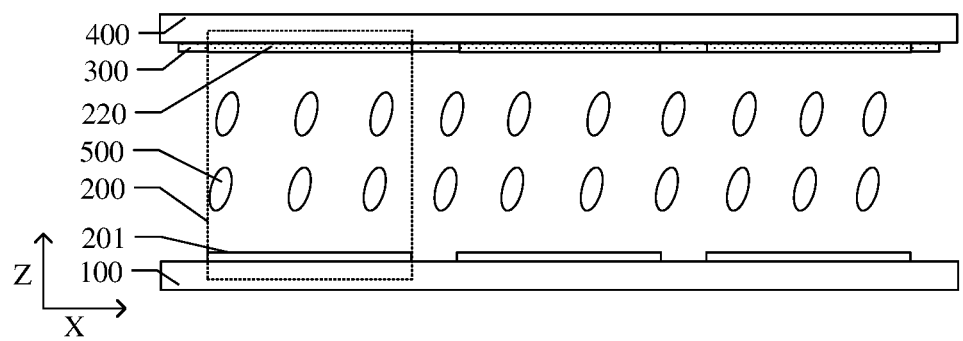
FIG. 6 is a cross-sectional view taken along line B'B' in FIG. 4.

FIG. 6 is a cross-sectional view taken along line B'B' in FIG. 4. As shown in FIG. 6, in an example of the embodiment of the present disclosure, the black matrix 300 and the light shielding structure 220 are integrated. That is, the light shielding structure 220 located at the edge of the pixel unit 200 is connected with the black matrix 300 into a whole, so as to facilitate manufacturing the mask which is used for manufacturing the black matrix and the light shielding structure. For example, the light shielding structure 220 and the black matrix 300 can be manufactured by using a mask which has openings such as pixel regions.

In some examples, as shown in FIGS. 4-6, the plurality of pixel units 200 are uniformly distributed on the base substrate 100. That is, the pixel units 200 provided with the plurality of pixel regions 210 are distributed not only at the edge of the base substrate 100, but also at the center of the base substrate 100, so as to ensure the uniformity of the reproduced image.

In some examples, the number of pixel regions 210 included in each pixel unit 200 is the same and the pixel regions 210 included in each pixel unit 200 are uniformly distributed, thus ensuring that the liquid crystal spatial light modulator reproduces a three-dimensional image with uniform intensity.

For example, in the case where the shape of the pixel unit is rectangular and the shape of the pixel region is also rectangular, the two right-angle sides of the pixel unit can be parallel to the two right-angle sides of the pixel region, so as to facilitate design and display.

For example, the liquid crystal spatial light modulator further includes a common electrode (not shown), and the plurality of pixel units 200 can share one common electrode. The common electrode can be located on the base substrate 100 or the opposing substrate 400, as long as the common electrode and the pixel electrode can act on the liquid crystal molecules in the corresponding pixel unit when an electric field is applied therebetween.

For example, alignment films (not shown) are provided on one side of the opposing substrate 400 facing the base substrate 100 and on one side of the base substrate 100 facing the opposing substrate 400, so as to align the liquid crystal molecules in the liquid crystal layer 500.

For example, polarizers (not shown) are provided on one side of the opposing substrate 400 away from the base substrate 100 and on one side of the base substrate 100 away from the opposing substrate 400, and the polarization directions of the two polarizers are perpendicular.

Figure 7:
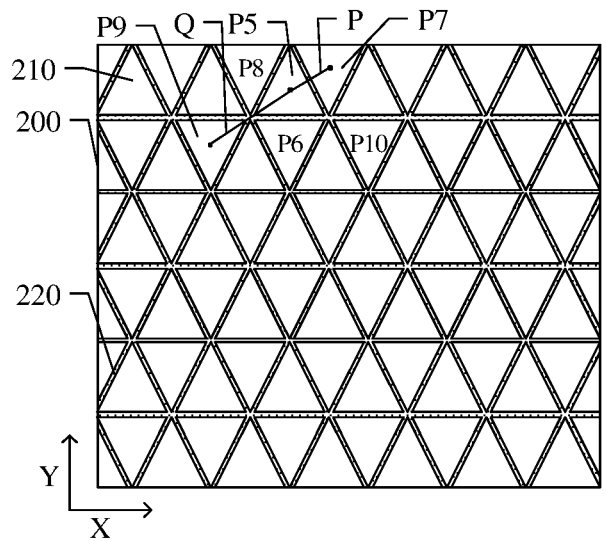
FIGS. 7-9 are planar structural views of pixel units according to some examples of an embodiment of the present disclosure.
Figure 8:
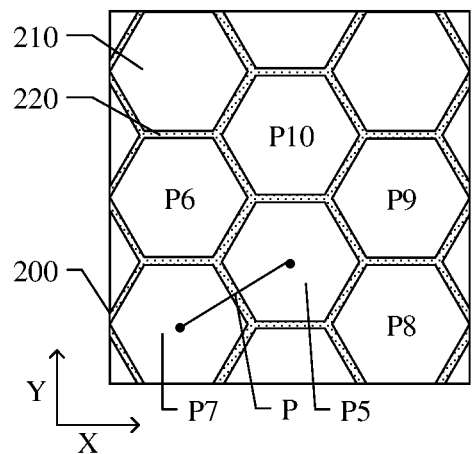
Figure 9:
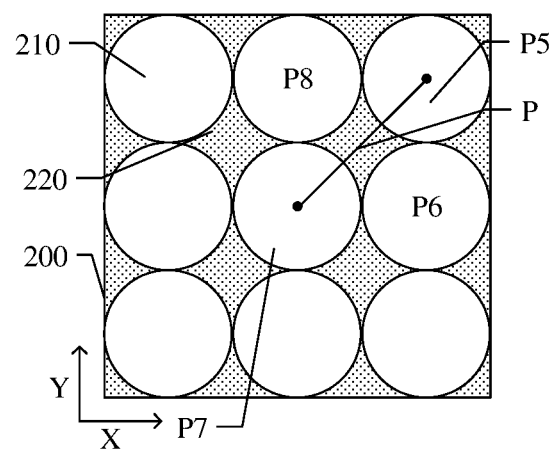

FIGS. 7-9 are planar structural views of pixel units according to some examples of an embodiment of the present disclosure. As shown in FIG. 7, the difference from the example shown in FIG. 4 is that the pixel region 210 included in the pixel unit 200 in the present example is triangular in shape.

For example, the maximum size of the pixel region 210 in the direction parallel to the base substrate is not more than 3 microns. For example, the side length of the pixel region 210 is not more than 1 micron.

As shown in FIG. 7, the light shielding structure 220 is disposed between adjacent pixel regions 210. For example, in the direction along the line connecting centers of adjacent pixel regions 210, the maximum size of the light shielding structure 220 located between the adjacent pixel regions 210 is not more than 1 micron. For example, as shown in FIG. 7, taking the pixel region P5 as an example, the pixel regions P6 to P10 are all pixel regions adjacent to the pixel region P5. Taking the pixel region P5 and the pixel region P7 as an example, the maximum size of the light shielding structure 220 between the pixel region P5 and the pixel region P7 is not more than 1 micron in the extension direction of the line P connecting centers of the two pixel regions. Taking the pixel region P5 and the pixel region P9 as examples, the maximum size of the light shielding structure 220 between the pixel region P5 and the pixel region P9 is not more than 1 micron in the extension direction of the line Q connecting centers of the two pixel regions.

Other structural features of the liquid crystal spatial light modulator provided in the present example are the same as those of the liquid crystal spatial light modulator shown in FIGS. 4-6, and details will not be repeated here.

As shown in FIG. 8, the difference from the example shown in FIG. 4 is that the pixel region 210 included in the pixel unit 200 in the present example is hexagonal in shape.

For example, the maximum size of the pixel region 210 in the direction parallel to the base substrate is not more than 3 microns. For example, the side length of the pixel region 210 is not more than 1 micron.

As shown in FIG. 8, the light shielding structure 220 is disposed between adjacent pixel regions 210. For example, in the direction along the line connecting centers of adjacent pixel regions 210, the maximum size of the light shielding structure 220 located between the adjacent pixel regions 210 is not more than 1 micron. For example, as shown in FIG. 8, taking the pixel region P5 as an example, the pixel regions P6 to P10 are all pixel regions adjacent to the pixel region P5. Taking the pixel region P5 and the pixel region P7 as examples, the maximum size of the light shielding structure 220 between the pixel region P5 and the pixel region P7 is not more than 1 micron in the extension direction of the line P connecting centers of the two pixel regions.

Other structural features of the liquid crystal spatial light modulator provided in the present example are the same as those of the liquid crystal spatial light modulator shown in FIGS. 4-6, and details will not be repeated here.

As shown in FIG. 9, the difference from the example shown in FIG. 4 is that the pixel region 210 included in the pixel unit 200 in the present example is circular in shape.

For example, the maximum size of the pixel region 210 in the direction parallel to the base substrate is not more than 3 microns. For example, the diameter of the pixel region 210 is not more than 1 micron.

As shown in FIG. 9, the light shielding structure 220 is disposed between adjacent pixel regions 210. For example, in the direction along the line connecting centers of adjacent pixel regions 210, the maximum size of the light shielding structure 220 located between the adjacent pixel regions 210 is not more than 1 micron. For example, as shown in FIG. 9, taking the pixel region P5 as an example, the pixel regions P6 to P10 are all pixel regions adjacent to the pixel region P5. Taking the pixel region P5 and the pixel region P7 as examples, the maximum size of the light shielding structure 220 between the pixel region P5 and the pixel region P7 is not more than 1 micron in the extension direction of the line P connecting centers of the two pixel regions.

Other structural features of the liquid crystal spatial light modulator provided in the present example are the same as those of the liquid crystal spatial light modulator shown in FIGS. 4-6, and details will not be repeated here.

In the embodiments of the present disclosure, the shape of the pixel region is not limited to the shapes shown in FIGS. 4-9. For example, the shape of the pixel region can be a polygon or an irregular shape, etc., as long as the maximum size of the pixel region in the direction parallel to the base substrate is not more than 3 microns.

Figure 10:
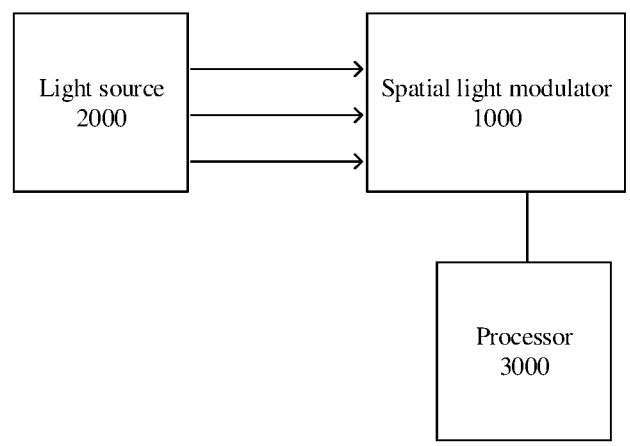
FIG. 10 is a partial structural view of a three-dimensional display device according to an embodiment of the present disclosure.

Another embodiment of the present disclosure provides a three-dimensional display device, and FIG. 10 is a partial structural view of a three-dimensional display device according to an embodiment of the present disclosure. As shown in FIG. 10, the three-dimensional display device includes a processor 3000, a light source 2000, and the liquid crystal spatial light modulator 1000 provided in any one of the embodiments shown in FIGS. 4-9. The processor 3000 is connected with the liquid crystal spatial light modulator 1000 to load the signal of a preset three-dimensional hologram into the liquid crystal spatial light modulator 1000, light emitted from the light source 2000 is incident on the liquid crystal spatial light modulator 1000, and the liquid crystal spatial light modulator 1000 is configured to perform phase modulation on the incident light according to the signal of the preset three-dimensional hologram to reproduce a three-dimensional image corresponding to the signal of the preset three-dimensional hologram. The three-dimensional display device provided in the present embodiment can increase the viewing angle of the image point reproduced by the liquid crystal spatial light modulator, so as to basically meet the viewing requirements of human eyes for three-dimensional objects. In addition, the three-dimensional display device provided by the embodiment of the present disclosure has a simple structure and can effectively reduce the cost.

In some examples, the three-dimensional image formed by the liquid crystal spatial light modulator 1000 is a real image.

For example, a light field camera can be used to acquire the intensity information and depth information of a three-dimensional object or a three-dimensional scene, and then the intensity information and depth information is input to the processor 3000, thus obtaining a hologram.

For example, the processor 3000 can be configured to execute non-transitory computer-readable instructions, and upon the non-transitory computer-readable instructions being executed by the processor, the above-described process of synthesizing a hologram of a three-dimensional object is executed.

For example, the processor 3000 can be a central processing unit (CPU) or a processing unit in any other form with data processing capability and/or program execution capability, such as a graphics processing unit (GPU), a field programmable gate array (FPGA) or a tensor processing unit (TPU).

For example, the processor 3000 can be a processor in a computer, and the computer can be connected with the liquid crystal spatial light modulator 1000 through a video interface, so as to load a calculated three-dimensional object hologram into the spatial light modulator 1000. For example, the liquid crystal spatial light modulator includes an electrically addressed pure-phase liquid crystal spatial light modulator, which controls the birefringence of liquid crystal by controlling the voltage to change the spatial orientation of liquid crystal molecules in the liquid crystal layer, so as to control the phase plane of light waves. The nematic liquid crystal in the pure-phase liquid crystal spatial light modulator is a kind of uniaxial birefringent crystal, and the optical axis thereof is parallel to the major axis of liquid crystal molecules. When an external electric field is applied to the liquid crystal molecules, the liquid crystal molecules tilt, resulting in a phase difference between the incident light incident on the liquid crystal layer and the output light obtained after the incident light passes through the liquid crystal layer. Therefore, when different voltages are applied to the pixel electrodes in respective pixel units, the liquid crystal molecules that are driven by the pixel electrodes to deflect will perform corresponding phase modulation on the incident light.

For example, the light source 2000 may be a laser or a monochromatic light source such as a light emitting diode, etc.

For example, the light emitted from the light source 2000 is collimated and expanded, and then irradiated on the spatial light modulator 1000; after the light beam is modulated by the hologram, the diffracted light exited from the spatial light modulator 1000 forms a three-dimensional image by a lens for human observation.

For example, a plurality of monochromatic light sources of different colors can be used to illuminate the spatial light modulator to realize color imaging. For example, color imaging can be realized by using a red light source, a green light source, a blue light source and three spatial light modulators in one-to-one correspondence with the above three color light sources. For example, color imaging can also be realized by using a red light source, a green light source, a blue light source and a time-sharing multiplexed spatial light modulator.

The following statements should be noted:

(1) In the accompanying drawings of the embodiments of the present disclosure, the drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto, and the protection scope of the present disclosure should be based on the protection scope of the claims.

What is claimed is:

1. A liquid crystal spatial light modulator, comprising:
a base substrate;
a plurality of pixel units arranged in an array, each of the plurality of pixel units comprising one pixel electrode, the pixel electrode being located on the base substrate,
wherein each of the plurality of pixel units comprises a light shielding structure, and the light shielding structure is configured to divide the each of the plurality of pixel units into a plurality of pixel regions;
a maximum size of each of the plurality of pixel regions in a direction parallel to the base substrate is not more than 3 microns;
each pixel electrode corresponds to the plurality of pixel regions, the light shielding structure is located between adjacent pixel regions to separate the adjacent pixel regions from each other, and each pixel region is served as an opening region to modulate incident light.

2. The liquid crystal spatial light modulator according to claim 1, wherein, in a direction along a line connecting centers of adjacent ones of the pixel regions, a maximum size of the light shielding structure located between the adjacent ones of the pixel regions is not more than 1 micron.

3. The liquid crystal spatial light modulator according to claim 2, wherein, in the direction along the line connecting centers of adjacent ones of the pixel regions, the maximum size of the light shielding structure located between the adjacent ones of the pixel regions is smaller than a maximum size of the pixel region.

4. The liquid crystal spatial light modulator according to claim 2, wherein a thickness of the light shielding structure is in a range from 50 nanometers to 5 microns in a direction perpendicular to the base substrate.

5. The liquid crystal spatial light modulator according to claim 1, wherein an orthographic projection of the light shielding structure on the base substrate is overlapped with an orthographic projection of the pixel electrode on the base substrate, so as to divide the each of the plurality of pixel units into the plurality of pixel regions.

6. The liquid crystal spatial light modulator according to claim 1, further comprising:
a black matrix, an orthographic projection of the black matrix on the base substrate being located between orthographic projections of adjacent ones of the pixel units on the base substrate,
wherein the black matrix and the light shielding structure are arranged in a same layer and made of a same material.

7. The liquid crystal spatial light modulator according to claim 6, wherein the black matrix and the light shielding structure are integrated.

8. The liquid crystal spatial light modulator according to claim 6, comprising:
an opposing substrate, arranged opposite to the base substrate; and
a liquid crystal layer, located between the opposing substrate and the base substrate,
wherein the pixel electrode in each of the plurality of pixel units is configured to drive liquid crystal molecules corresponding to the plurality of pixel regions in the each of the plurality of pixel units.

9. The liquid crystal spatial light modulator according to claim 8, wherein the light shielding structure and the black matrix are both located at a light exiting side of the liquid crystal layer.

10. The liquid crystal spatial light modulator according to claim 8, wherein the light shielding structure is located at one side of the liquid crystal layer away from the base substrate.

11. The liquid crystal spatial light modulator according to claim 1, wherein each of the plurality of pixel units is configured to be driven independently.

12. The liquid crystal spatial light modulator according to claim 1, wherein the plurality of the pixel units are uniformly distributed on the base substrate.

13. The liquid crystal spatial light modulator according to claim 1, wherein a maximum size of each of the plurality of pixel units in a direction parallel to the base substrate is less than 30 microns.

14. The liquid crystal spatial light modulator according to claim 1, wherein a shape of the pixel region comprises a polygon or a circle.

15. The liquid crystal spatial light modulator according to claim 1, wherein each of the plurality of pixel units includes the same number of pixel regions, and the pixel regions included in each of the plurality of pixel units are uniformly distributed.

16. A three-dimensional display device, comprising a processor, a light source and the liquid crystal spatial light modulator according to claim 1, wherein the processor is connected with the liquid crystal spatial light modulator to load a signal of a preset three-dimensional hologram into the liquid crystal spatial light modulator, light emitted from the light source is incident on the liquid crystal spatial light modulator, and the liquid crystal spatial light modulator is configured to perform phase modulation on incident light according to the signal to reproduce a three-dimension image corresponding to the signal of the preset three-dimensional hologram.

17. The three-dimensional display device according to claim 16, wherein the three-dimensional image is a real image.

18. A liquid crystal spatial light modulator, comprising:
a base substrate;
a plurality of pixel units arranged in an array, each of the plurality of pixel units comprising one pixel electrode, the pixel electrode being located on the base substrate,
wherein each of the plurality of pixel units comprises a light shielding structure, and the light shielding structure is configured to divide the each of the plurality of pixel units into a plurality of pixel regions;
a maximum size of each of the plurality of pixel units in a direction parallel to the base substrate is less than 30 microns;
in an arrangement direction of the plurality of pixel units, a size of the pixel unit is an integral multiple of a size of the pixel region and an integral multiple of a size of a distance between adjacent pixel regions.

19. A liquid crystal spatial light modulator, comprising:
a base substrate;
a plurality of pixel units arranged in an array, each of the plurality of pixel units comprising one pixel electrode, the pixel electrode being located on the base substrate,
wherein each of the plurality of pixel units comprises a light shielding structure, and the light shielding structure is configured to divide the each of the plurality of pixel units into a plurality of pixel regions;
a maximum size of each of the plurality of pixel regions in a direction parallel to the base substrate is not more than 3 microns;
in a direction along a line connecting centers of adjacent ones of the pixel regions, a maximum size of the light shielding structure located between the adjacent ones of the pixel regions is not more than 1 micron.

* * * * *